Patented Dec. 31, 1940

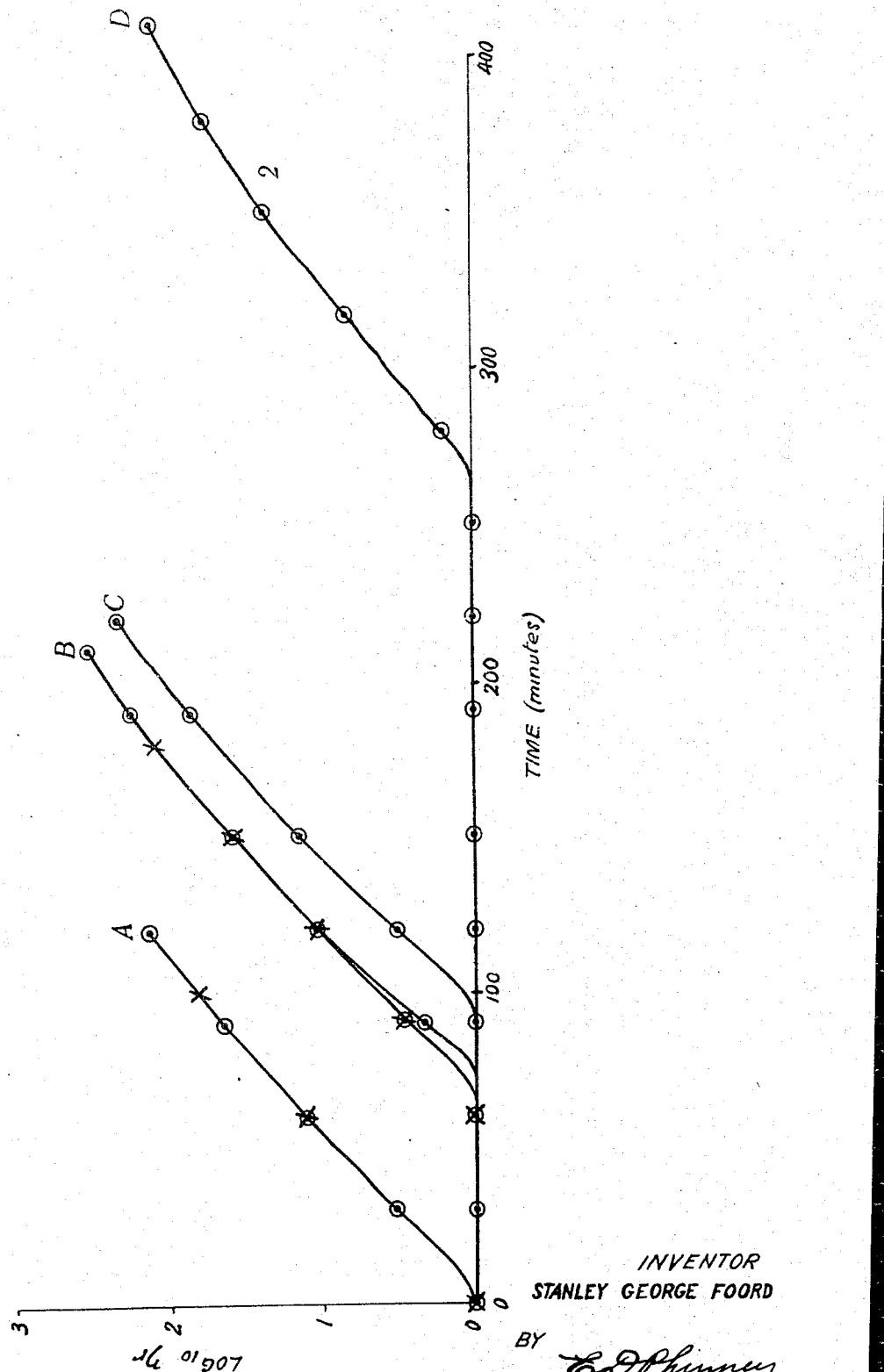

2,226,714

UNITED STATES PATENT OFFICE 2,226,714

STABILIZATION OF STYRENE

Stanley George Foord, London, England, assignor to International Standard Electric Corporation, New York, N. Y.

Application September 11, 1937, Serial No. 163,377

3 Claims. (Cl. 260—91)

This invention relates to stabilized styrene and to a process for producing the same, wherein the formation of polymers thereof is retarded, more particularly during storage of the styrene. The invention also relates to polymerized styrene produced from such stabilized styrene and to a process for producing such polymerized styrene.

A certain amount of knowledge exists as to substances which will stabilize monomeric styrene, but such knowledge is very incomplete. It has been stated that agents adapted substantially to prevent polymerization of styrene are substances which are mild oxidizing agents, and are identified as substances which do not give up their oxygen in gaseous form. This class was stated to include quinone, mononitronaphthalene, trinitrotoluene, nitrobenzene, dinitrobenzene, trinitrobenzene and derivatives of these compounds such as pikramid. An organic oxidizing agent containing a benzene nucleus in which oxygen replaces hydrogen atoms, and more particularly quinone has been suggested for the same purpose. It was stated that each of these substances, including quinone, retards polymerization up to a temperature of 170° C. but above this temperature the action is reversed and the substances act as accelerators of polymerization. The proportion of quinone proposed to be used was from 0.25% to 1% by weight of the styrene whether as such or in solution, and it was stated that distillation of 2 to 3 hours at 140° C. in the presence of 1% of quinone produces not more than 0.2–0.5% polymer, whereas in the absence of quinone or similar material a similar distillation gives 10–20% polymer.

In the practice in accordance with the above mentioned means for stabilizing styrene, it is necessary, before proceeding to carry out polymerization, to remove the stabilization agent, by some such means as washing out with caustic soda solution or by distillation.

I have discovered, however, that the stabilization of styrene may be carried out by the addition of quinone in such manner that no distillation or washing is necessary when polymerization is desired, and that the period of stabilization can be very closely controlled according to the amount of quinone added, the amounts necessary and desirable being very much smaller than previously proposed.

I have discovered that the action of quinone upon styrene is not such as to prevent indefinitely the polymerization of the styrene. On the contrary, when quinone is added to styrene a reaction takes place between quinone and styrene resulting in the formation of a compound which has no appreciable anti-catalytic effect. Therefore, when all the quinone has been absorbed by this reaction, the polymerization of the styrene proceeds at approximately the same rate as in the absence of any stabilizing agent. This reaction takes place very slowly at room temperatures but much more rapidly at higher temperatures. The period during which no polymerization takes place may be termed the induction period. By the addition of quinone, therefore, the natural short time induction period of styrene at normal temperatures may be prolonged, and/or an induction period caused to occur at temperatures at which it would otherwise not occur. The percentages of quinone needed for this purpose are very small and the length of the induction period is dependent directly upon the amount of quinone added. For the stabilization of styrene at room temperature, for example, from 0.005% to 0.05% of quinone may be added to the styrene, dependent upon the period of stabilization required. If it be then desired to polymerize the styrene before the conclusion of the period of stabilization, it is only necessary to heat the styrene for a comparatively brief period in order to destroy the stabilization action of the quinone. For example, the induction period of styrene containing 0.05% of quinone is 70 minutes at 120° C.

Thus, if it be desired to polymerize the styrene at a temperature of 120° C. or below, it is only necessary to heat the styrene containing this percentage of quinone for one hour at 120° C. to destroy the stabilizing action of the quinone on the styrene almost completely. The time of heating required for a particular degree of polymerization is thus only a very short time longer than the normal period. Should it be desired to polymerize the styrene at 120° C. it will be clear that the presence of 0.05% of quinone in the styrene prolongs the time of polmerization by the induction period of 70 minutes only.

The use of small amounts of quinone, from 0.005% to 0.05%, for stabilizing styrene, possesses considerable advantages over the use of the larger amounts hitherto thought necessary. The addition of appreciable quantities of quinone to styrene raises the alternating current power factor of the material, both before polymerization and after. The rise in power factor caused by the addition of 0.25% to 1% of quinone is marked but with the small amounts of quinone used in accordance with the invention, this rise is inappreciable. Thus the power factor of monomeric styrene containing 0.05% of quinone is no higher than that of the styrene alone. The power factor of polymerized styrene containing the reaction product of styrene with quinone, when 0.05% of quinone was added is no greater than in the absence of the quinone. Furthermore, the product of the reaction between quinone and styrene when present in any but small quantity decreases the pliability of the polymerized product. This decrease is inappreciable, when 0.05% of quinone has been added to the styrene but is appreciable with 0.25% and over. This is a matter of importance, particularly when the polymerized product is to be used in the form of extruded threads.

It will be noted that by the use of the invention the correct amount of quinone may be added to stabilize the styrene for a desired length of time, so that there is no excess of stabilizer at the end of the period when the time comes for polymerization. It will be readily understood that, where it is desired to produce only that particular composition of the polymerized product that is produced by polymerization at a particular definite temperature corresponding precautions must be taken. Thus if the temperature of polymerization required is above room temperature, an amount of quinone is added which is slightly in excess of that required to stabilize for a given period, in order to ensure that no polymerization occurs at room temperature prior to the brief heating period. Pure styrene remains stable at 25° C. (i. e. approximately room temperature) for about five weeks in the dark, with 0.01% of quinone for not less than 25 weeks, with 0.02% quinone for not less than 50 weeks, and with 0.05% quinone for about 150 weeks. If the temperature of polymerization required is above room temperature and below 120° C. it may be found advisable, in order to avoid too prolonged heating at the temperature of polymerization, to heat at 120° C. for a period slightly below the induction period at that temperature and then to reduce the temperature to that of the desired polymerization.

The curves in the accompanying drawing show the effect of different quantities of quinone upon the course of polymerization of styrene at 120° C. Abscissae represent time in minutes and ordinates the logarithm of the relative viscosity, i. e. of the ratio of the viscosity at the moment under consideration to the initial viscosity, which may be taken as a measure of the degree of polymerization. Curve A shows the course of polymerization of styrene redistilled under reduced pressure. I have found that if the styrene be saturated with hydroquinone at room temperature, the polymerization follows exactly the same curve. Thus hydroquinone in such quantity has no effect in retarding the polymerization of pure styrene at 120° C. Curve B shows the course of polymerization of styrene to which 0.05% of quinone has been added. It will be observed that there is an induction period of less than 70 minutes and that thereafter the polymerization proceeds at the same rate as for pure styrene. During the induction period the deep yellow colour of the quinone gradually disappears as a slow reaction with the styrene occurs forming a pale yellow product. The end of the induction period coincides with the disappearance of the quinone colour. Curve C shows the course of polymerization of styrene to which 0.05% of quinone has been added, which has been shaken with hydroquinone. There is a slight increase in the induction period than with quinone alone, but the effect is of a minor order. Apparently hydroquinone was not taken up in any greater quantity than is capable of solution in styrene itself since no green colour due to quinhydrone was apparent. Curve D shows the course of polymerization of styrene to which 0.20% of quinone has been added. It will be noted that there is a considerable increase in the length of the induction period, so that the additional time of heating required becomes uneconomic. It will be noted also that in curve D the rate of increase with time of the relative viscosity is less than with curves A, B and C. The rate of increase of the relative viscosity is only a true indication of the rate of polymerization when the specific viscosity of the polymers formed is the same. In the case of curve D there is a slight fall in the specific viscosity of the polymer formed, and therefore the decrease in the slope of curve D is not entirely due to a decrease in the rate of polymerization. Nevertheless, even 0.20% of quinone has some effect in slowing up the polymerization after the end of the induction period.

It should be noted that if styrene has approached or even passed the end of its induction period during storage, the addition of amounts of quinone according to the invention prevents further polymerization during an induction period depending upon the amount of quinone added.

Since quinone acts as a stabilizing agent during a period within which it is reacting with the styrene it is to be expected that the presence of other substances mixed with the styrene does not interfere with the stabilizing effect of quinone provided that these other substances are such as do not react with quinone.

A plasticizing agent is frequently added to monomeric styrene to secure greater plasticity in the polymerized styrene formed from the monomeric styrene. All such plasticizing agents known to me are such as do not react with quinone and it is therefore to be expected that the presence of a plasticizing agent does not interfere with the stabilizing action of quinone. I have verified the above in the case of certain plasticizing agents. I have found, for example, that the further addition of quinone to a mixture of 90% by volume of styrene and 10% of a chlorinated diphenyl (which latter has been added to act as a plasticizing agent) produces an induction period of a magnitude which is dependent only upon the amount of quinone, and which is independent of the presence of the chlorinated diphenyl. Moreover, quinone has no appreciable effect on the subsequent polymerization reaction, after the end of the induction period. It is to be understood that the amount of quinone to be added for stabilizing such a mixture of styrene and plasticizing agent for a given period of time is based upon the weight of styrene present in the mixture.

What is claimed is:

1. Stabilized styrene containing quinone but not more than about 0.05 percent of quinone as a stabilizing agent.

2. Polymerized styrene polymerized from a stabilized styrene containing quinone but not more than about 0.05 precent of quinone.

3. The process of stabilizing styrene to prevent substantial polymerization thereof during storage but without substantially decreasing the rate of polymerization thereof at 120° C. in comparison with the rate of polymerization of unstabilized styrene at said temperature which comprises incorporating about 0.005 to 0.05 percent of quinone therein.

STANLEY GEORGE FOORD.